United States Patent Office 3,428,592
Patented Feb. 18, 1969

3,428,592
POLYISOCYANATE EMULSIONS
Mortimer Alexander Youker, Clearwater, Fla., assignor to E. I. du Pont de Nemours and Company, Wilmington, Del., a corporation of Delaware
No Drawing. Filed May 24, 1966, Ser. No. 552,427
U.S. Cl. 260—29.2                                    6 Claims
Int. Cl. C08g 41/02

ABSTRACT OF THE DISCLOSURE

Aqueous dispersions of aromatic isocyanates having an isocyanato function of at least two are prepared by dissolving the isocyanate in an N-alkylated amide of an aliphatic carboxylic acid or an N-alkylated sulfonamide, both the amide and sulfonamide having from 6 to 25 carbon atoms, and subsequently dispersing said isocyanate solution in water having a stabilizing amount of an emulsifying agent dispersed therein.

---

This invention relates to aqueous emulsions of aromatic polyisocyanates. More particularly this invention relates to emulsions of aromatic isocyanates and alkylated amides.

In its broadest definition this invention is an aqueous emulsion comprising:

(I) From 10 to 100 parts by weight of water and
(II) A stabilizing amount of an emulsifying agent, having dispersed therein
(III) 10 parts by weight of an aromatic isocyanate compound containing at least 4% by weight of aromatic isocyanato groups and having an isocyanato functionality of at least 2 dissolved in
(IV) From 1 to 100 parts by weight of a solvent comprising an N-alkylated amide of an aliphatic carboxylic acid, said amide having from 6 to 25 carbon atoms, or an N-alkylated sulfonamide, said sulfonamide having from 6 to 25 carbon atoms, or mixtures thereof; i.e. the compositions of this invention are aqueous dispersions having as the dispersed phase a solution of an aromatic polyisocyanate in certain specific solvents.

The term isocyanato functionality as employed herein represents the average number of isocyanato groups per mole of the aromatic isocyanate. Thus a pure aromatic diisocyanate would have an isocyanato functionality of 2. An equimolar mixture of a pure aromatic diisocyanate and a pure aromatic triisocyanate would have an isocyanato functionality of 2.5. The isocyanato functionality for a complex mixture can be determined from the number average molecular weight and the isocyanato group content. The isocyanato group content can be determined by the assay procedure given by ASTM test method D1638–60T for tolylene diisocyanate.

The term "aromatic" is used herein to describe organic isocyanates in which the isocyanate groups are directly attached to a benzene or a naphthalene nucleus.

Representative of the aromatic isocyanates which can be used to make the composition of this invention are: phenylene diisocyanates, substituted phenylene diisocyanates, including the preferred tolylene diisocyanates, naphthalene diisocyanates, methylene-bis(4-phenyl isocyanate) and its substituted derivatives, benzidine diisocyanate and derivatives, triphenylmethane triisocyanate and derivatives. Diisocyanates and triisocyanates in which two benzene rings are joined through an ether, thioether or sulfone linkage can also be used and include compounds such as 2,4,4′-triisocyanatodiphenyl ether, 4,4′-diisocyanatodiphenyl sulfide and 4,4′-diisocyanatodiphenyl sulfone.

While aromatic polyisocyanates such as those in the preceding paragraph can be used in distilled form it is preferable to employ them as the undistilled products resulting from the phosgenation of the corresponding amines. Representative phosgenation processes for aromatic amines are disclosed in U.S. Patents 2,822,373, 2,680,127 and 2,908,703. The solvent employed in the above processes may be removed by fractional distillation. While it is usually desirable to remove essentially all of the solvent, a small residual amount normally does not interfere with the use of the undistilled aromatic polyisocyanate in the compositions of the present invention.

Products produced by removing a part of the volatile polyisocyanate from a phosgenation mass can also be used in the compositions of the present invention. Generally the amount of polyisocyanate allowed to remain in the undistilled product should be sufficient to provide a fluid product at normal or slightly elevated temperatures. The more viscous materials prepared by removing most of the polyisocyanate contained in a phosgenation product can be used in the compositions of the present invention but are less convenient to handle.

A particularly useful class of polyisocyanates can be prepared by phosgenating the polyamines resulting from the condensation of formaldehyde with aromatic amines such as aniline and o-toluidine. By changing the ratio of amine to formaldehyde, the amount of diamine produced can be varied within limits. The other compounds produced along with the diamine are polyamines containing three or more amino groups. The product of these condensations can be phosgenated directly after removal of uncondensed monoamines. Such phosgenation products, which are mixtures of di- and polyisocyanates, are ideally suited for use in the compositions of the present invention. Because of the very high boiling points of these mixtures, they are normally used without distillation other than to remove the solvent employed during phosgenation and perhaps a portion of the diisocyanates present. The undistilled polyisocyanate mixtures disclosed in U.S. Patent 2,683,730 are representative of products of this type wherein the proportion of polyfunctional material is high. U.S. 3,097,191 discloses related polyisocyanates prepared by using mixtures of amines, including diamines such as m-tolylene diamine, in the formaldehyde condensation followed by phosgenation which can be used in making the composition of this invention.

A variety of di- or polyfunctional compounds, which are reactive toward isocyanates, can be added to distilled or undistilled aromatic polyisocyanates to prepare other aromatic isocyanate compounds for use in the compositions of the present invention. These materials can be added in any amount consistent with the requirements of functionality and an isocyanato content of 4% by weight; however, to maintain the properties provided by the polyureas produced from the compositions of this invention at a high level, the amount of such compounds added preferably should not exceed the weight of the polyisocyanate. For the same reason, it is preferred that the amount of such compounds should not contain a quantity of active hydrogen sufficient to consume more than about half of the isocyanato groups contained in the unmodified polyisocyanate. The following are representative of such di- and polyfunctional active hydrogen compounds which may be of use: low molecular weight glycols and polyols such as ethylene glycol, propylene glycol, butanediol-1,4, neopentyl glycol, 1,2,6-hexanetriol, castor oil, glycerin and trimethylolpropane; polymeric glycols and polyols such as (1) polyalkyleneether glycols and polyols which may be derived by condensing ethylene or propylene oxide with low molecular weight glycols, polyols, aminoalcohols and diamines, (2) polytetramethylene ether glycol, (3) polyester glycols and polyols prepared from diacids and low molecular weight glycols and polyols by esterification nad (4) polythioethers; and low molecular weight aliphatic and aromatic di- and polyamines such as ethylene diamine, hexamethylene diamine, diethylene triamine, xylylene diamine, phenylene diamine, tolylene diamine, methylene dianiline, 3,3′-dichloro-4,4′-diaminodiphenylmethane and 2,4,4′-triaminodiphenyl ether.

When active-hydrogen compounds of the types listed above are used, they can be added to and reacted with the polyisocyanate prior to mixing with the solvent component and emulsion formation. Alternatively, the active-hydrogen compound can be added to a mixture of an aromatic polyisocyanate and the solvent component and reacted in the presence of the solvent prior to emulsion formation. Active-hydrogen compounds may also be added by dissolving or dispersing them in the water used for emulsion formation. In this case reaction of isocyanato groups with active-hydrogens usually will be completed on or within the material treated with the emulsion.

The solvent component required in the dispersed organic phase of the emulsions of this invention is an N-alkylated amide of a carboxylic acid or a sulfonic acid.

The N-alkylated amides of aliphatic carboxylic acids cn be represented by the general formula:

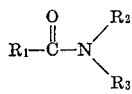

wherein $R_1$, $R_2$ and $R_3$ can be alkyl, cycloalkyl or arylalkyl and $R_1$ and either $R_2$ or $R_3$ can be hydrogen. $R_1$ can contain one or two carbon-carbon double bonds. $R_1$, $R_2$, and $R_3$ can be independently selected as long as the total number of carbon atoms contained in the three groups ranges from 5 up to and including 24. $R_2$ and $R_3$ may be alkylene groups and form a ring which may additionally contain a hetero-atom such as oxygen or sulfur. Diamides derived from aliphatic dicarboxylic acids can also be used as long as they have at least one alkyl substituent on each amide nitrogen and contain from 5 to 24 carbon atoms excluding the two carboxyl carbon atoms. Suitable compounds represented by this general formula include N,N-di-n-butylformamide, N,N-di-isopropylacetamide, N-butyrylpiperidine, N-propionylmorpholine, N,N-dimethyl capramide, N-butyl capramide, N,N-diethyl lauramide, N,N-dimethyl oleamide, N,N-dimethyl linoleamide, N-methyl stearamide, N,N-dimethyl stearamide and N,N,N′,N′-tetramethyl adipamide. Especially preferred are the N-methyl amides and the N,N-dimethyl amides of the naturally occurring $C_6$ to $C_{18}$ fatty acids. Amides prepared from naturally occurring mixtures of fatty acids, which often contain some unsaturated acids, are also useful, as for example N,N-dimethyl cocoamide which is the dimethyl amide of the mixed fatty acids, principally $C_{10}$, $C_{12}$ and $C_{14}$ aliphatic acids, obtained by the saponification of coconut oil.

The N-alkylated amides of sulfonamides can be represented by the general formula:

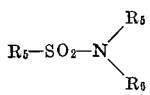

wherein $R_4$, $R_5$ and $R_6$ are alkyl, cycloalkyl or arylalkyl groups. Additionally, either $R_5$ or $R_6$ can be hydrogen and $R_4$ may be an aryl group. $R_4$, $R_5$ and $R_6$ can be selected independently as long as the sum of the carbon atoms in the three groups is from 6 to 25. $R_5$ and $R_6$ can also be alkylene groups and form a ring which may contain a hetero-atom such as oxygen or sulfur. Suitable compounds represented by this general formula include N,N-diethyl ethanesulfonamide, N-butyl neopentylsulfonamide, N,N-dimethyl benzenesulfonamide, N-ethyl-N-methyl benzenesulfonamide, N-ethyl p-toluenesulfonamide, N,N-diethyl toluene-α-sulfonamide, N-ethyl toluene-α- sulfonamide and N-methyl-N-ethyl p-toluenesulfonamide. Mixtures of such compounds can often be used to advantage to lower the melting points of the individual sulfonamides. It should be noted that a further reduction of melting point is obtained upon mixing the sulfonamide with the isocyanate component. A particularly useful solvent is the commercially available mixture of about equal parts of the ortho and para isomers of N-ethyl toluenesulfonamide. As sold, this mixture also contains minor amounts of unalkylated toluene sulfonamides, but these do not interfere with the preparation or application of the emulsions of this invention.

A wide variety of materials can be used to stabilize the emulsions of this invention or to aid in their formation. These include non-ionic, anionic and cationic types of surface active agents and dispersing agents. In general, agents which do not cause excessive foaming and which are relatively insensitive to pH changes are preferred. It is also preferable that the surface active agent not react readily with isocyanato groups. Many anionic and non-ionic surfactants meet these requirements and are particularly useful. As anionic surface active agents alkyl and aryl sulfonates and the formaldehyde condensation products of aryl sulfonates are useful. Alkyl substituted naphthalene sulfonic acid salts, their corresponding formaldehyde condensation products, lignin sulfates and similar sulfates are particularly useful. As non-ionic surface active agents, ethylene oxide condensates with long chain alkyl phenols and higher fatty acid amides are particularly useful. Cationic starch has also been found to be useful for preparing the present emulsions. Reference to general works on surfactants, such as "Encyclopedia of Surface Active Agents," Sisley and Wood, Chemical Publishing Company, provide extensive lists of suitable agents. In addition to surfactants to the types described above, other materials such as methyl cellulose can be used to advantage for thickening the emulsions, thus aiding emulsion formation and retarding phasing. Methyl cellulose can also be used as an emulsifying agent alone for preparing the emulsions of this invention. Finely divided insoluble solids, such as bentonite clay, can also be used to stabilize the emulsions. Usually sulfonic acid surfactants and/or methyl cellulose are adequate.

The emulsions of the present invention can be prepared by conventional methods. Batch preparation of the emulsions can be effected by adding a mixture of the isocyanate and solvent components to vigorously agitated water or conversely, the water may be added to the isocyanate-solvent mixture. The necessary emulsion stabilizing agents are usually dissolved in the water prior to emulsification, but can be added as a part of the isocyanate-solvent mixture if they are soluble and not highly reactive toward isocyanato groups, which is the case with methyl cellulose and amine salts of sulfonic acids for example. The emulsion stabilizing agents can also be added after the organic and water phases have been given a preliminary mix. The most uniform emulsions are obtained by using homogenizing equipment, but any high speed mixing device can be used. Continuous preparation of the emulsions can be performed by feeding the required oil and water phases at controlled rates into a high-shear mixing zone. Homogenizing equipment provides excellent results; however, useful emulsions can be formed by forcing the ingredients into a centrifugal pump installed so that flow through the pump is reversed. This latter procedure is advantageous in that the equipment is inexpensive and readily available. In preparing the emulsions, it is preferred that the quantities of the organic and water phases be about the same. The concentrated emulsions produced can be diluted to any desired concentration by the addition of water. The emulsions can, however, be prepared directly at low concentrations if so desired.

The organic phase of the emulsions of the present invention can be prepared from mixtures of about 10–90 parts by weight of an isocyanate component with 90–10 parts by weight complementally of one or a mixture of the solvents described hereinbefore. When the organic phase contains more than 90% isocyanate component the polyureas formed usually exhibit less cohesive strength. Compositions containing more than 90% solvent in the organic phase are not economically attractive. For many applications, mixtures providing an organic phase containing about equal parts of undistilled polyisocyanate and solvent are preferred.

The emulsions of the present invention can contain minor amounts of additives of the type normally employed in coating and adhesive formulations. Preferably, such additives should not react with the isocyanate component in the compositions. Antioxidants, pigments, fillers, resins and plasticizers, for example, can be added to advantage for certain applications. These materials can be included in the emulsions by adding them to the organic or water phase prior to emulsification. Alternatively, they can be added to the finished emulsion. When the compositions are used, these additional materials are incorporated into the polyureas produced. Useful products may be formed by including compatible resins and polymers. Solvents other than N-alkylated amides and sulfonamides can be added to the emulsions of this invention to serve as diluents or thinners. Such solvents are preferably inert toward isocyanato groups, immiscible with water and more volatile than the amide solvent component in the compositions.

The emulsions of this invention can be used to coat or impregnate a variety of substrates. Polyurea formation then places as a result of reaction with water which is contained in the emulsion and/or with water supplied by moisture in the substrate or in the atmosphere. Polyurea formation is usually accompanied by partial evaporation of water from the emulsion into the surrounding atmosphere.

Temperature influences the rate of polyurea formation. At ambient temperatures polyurea formation proceeds at a relatively slow rate. Higher temperatures increase the rate of polymer formation. The rate of polyurea formation is affected by the solvent contained in the polyisocyanate/solvent composition. Alkylated amides promote polyurea formation to a greater extent than do sulfonamides. It is often desirable to increase the rate of polyurea formation by the addition of tertiary amine catalysts. These catalysts are well known to those acquainted with isocyanate reactions. Represetative amines include N-ethyl morpholine, triethyene diamine and 1,3-bis(dimethylamino) butane. Because of their reactive nature, the emulsions of this invention are not stable for extended periods of time. In general, they should be used within about an hour. Obviously, their useful life will vary depending on the isocyanate and solvent involved, concentrations, temperature, catalyst concentration, if any be present, and the like.

Since the emulsions of the present invention have relatively low viscosities, application may be performed in a variety of conventional ways. These include spraying, brushing, padding, wiping, roll coating and dipping, for example. The exact manner of applying the compositions of this invention and forming polyureas therefrom will be clarified by the following description of some uses. The uses disclosed are not meant to serve as a restriction of any kind.

The compositions of this invention are ideally suited for use as impregnants, saturants or sealers for porous substances of many types. Where flexible substrates are involved, the in situ formation of the resinous polyureas confers strength and rigidity. In the case of moisture sensitive substrates, the presence of the polyureas improves mechanical properties in the presence of moisture. These types of improvements in properties makes the present emulsions particularly valuable for treating paper, paper board and related materials. Liner board containing polyurea formed in situ shows much improved tensile strength, burst resistance and compressive strength under both wet and dry conditions. Formation of the polyurea may be accomplished by applying the compositions of the present invention to wet or dry paper webs by spraying, sizing, dipping or roll coating, for example, and allowing the polyureas to form in the paper. The method of applying the emulsions has a surprising effect on the nature of the finished product. For example, paper treated by saturating with the emulsions is hydrophilic. Surprisingly, the hydrophilic paper exhibits improved wet properties compared with untreated paper. On the other hand, paper treated by sizing is hydrophobic and shows exceptional improvements in high humidity and wet properties including crush resistance. Because of these improvements in wet properties, kraft liner board and corrugating medium after sizing with the present emulsions can be used to prepare corrugated board and corrugated boxes which have remarkable strength when wet. The treated board and boxes are also stronger than conventional board and boxes when dry. Removal of water may be accomplished by evaporation with or without heating to produce a finished product. The treatment may be used in combination with other paper additives such as unreaformaldehyde resins, elastomer latices and rosins. These additives may be added before or after treatment with the compositions of this invention, and in some cases simultaneous addition is possible when treating agent is compatible with the emulsions of this invention. Extenders, such as sodium silicate and ammonium caseinate may be applied to paper from solution and after drying the paper may be treated with the emulsions of this invention.

In addition to applications to paper, the compositions of this invention can be used for stiffening, reinforcing, water proofing or modifying a variety of foamed plastic fabrics and specialty papers derived from natural and synthetic fibers such as asbestos, cotton, flax, nylon, poly(ethylene terephthalate) and polyacrylonitrile. For example in the application of polyurethane foam backing to rugs, carpets and the like it has been found that the backing is permeable to stains. By treating the foam backing with a polyisocyanate to form a polyurea coating on the surface of the polyurethane foam, the transmission of stains through the porous polyurethane backing is greatly reduced. The emulsions of this invention are convenient to use and very effective for this purpose. The compositions can be used to seal wood. This treatment is of particular value with soft, highly porous woods where incorporation of the polyurea improves resistance to water and surface marring and may upgrade mechanical properties. The compositions are useful for sealing the surface of porous masonry such as concrete, mortar, plaster, amesite, stone and brick. The compositions also can be used for sealing porous sub-surface formations in connection with underground storage of hydrocarbons, oil well drilling and related activities.

The emulsions find use in coating many substrates about as varied in nature as those described in the preceding paragraph. It should be pointed out that in many applications where the compositions are used for coating that more or less impregnation may occur simultaneously depending on the composition and means of application and the porosity of the substrate involved. The compositions are especially useful for coating wood. Tough, abrasion- and crack-resistant coatings which adhere so tightly that removal results in the pulling away of the wood fibers in contact with the coating film can be made by brushing, spraying or knife coating concentrated emulsions onto wood. For this purpose it may be desirable to thicken the emulsions with agents such as polyvinyl alcohol or methyl cellulose. Similar coatings can be applied to a variety of surfaces of limited porosity such as sized paper, finished leather and sealed concrete.

Another major field of applications comprises adhesive or binder uses. Concentrated emulsions are useful for binding wood chips, ground leather, ground cork and similar substances into sheet or molded forms. They are also very useful as adhesives for laminating sheet materials such as wood, paper and cloth into plied products. The strength of the polyureas renders them useful in producing structural members for a variety of purposes. Anti-skid grit can be bonded to concrete or other paving surfaces. The emulsions can further be used as flocking adhesives, binders for non-woven fabrics and soil treating agents.

Under proper conditions, the compositions of this invention can be used to prepare cellular products which may be described as being similar to conventional rigid polyurethane foams. In order to promote foam formation, a surfactant of the type normally used in preparing polyurethane foams should be incorporated in the polyisocyanate/solvent mixture. Suitable surfactants include (1) non-ionics prepared by sequential addition of propylene and ethylene oxides to polyfunctional compounds as propylene glycol, glycerin and ethylene diamine, (2) polydimethylsiloxane - polyalkylene - ether block copolymers such as described in U.S. 2,934,748; Canadian 669,881, and British, 1,015,611. Expansion of the polyurea is effected by the rapid evolution of carbon dioxide which occurs spontaneously when the polyisocyanate/solvent mixture reacts with water in the presence of large amounts of catalyst.

This invention is further illustrated by the following specific examples which are not however intended to fully delineate the scope thereof.

EXAMPLES

The following polyisocyanates are employed in the examples presented hereinafter:

POLYISOCYANATE A

Tolylene diamine (80% 2,4-isomer; 20% 2,6-isomer) is dissolved in o-dichlorobenzene and phosgenated essentially by the procedure disclosed in U.S. Patent 2,822,373. Following the phosgenation, o-dichlorobenzene is removed by fractional distillation at reduced pressure. The undistilled polyisocyanate contains about 85% of volatile tolylene diisocyanates with the remainder being phosgenation by-products.

POLYISOCYANATE B

Tolylene diamine (80% 2,4-isomer; 20% 2,6-isomer) is dissolved in o-dichlorobenzene and phosgenated essentially by the procedure disclosed in U.S. Patent 2,822,373. Following the phosgenation, o-dichlorobenzene and about half of the distillable diisocyanate are removed by fractional distillation. The undistilled portion of the polyisocyanate contains about 75% of volatile tolylene diisocyanates with the remainder being phosgenation by-products. The isocyanato group content of this polyisocyanate is about 37–38% by ASTM D 1638–60T.

POLYISOCYANATE C

Undistilled 4,4′-diaminodiphenylmethane, containing about 15% polyamines, is prepared by adding 1 mole of aqueous formaldehyde to an aqueous solution of 3 moles of aniline and 2.8 moles of hydrochloric acid. The formaldehyde addition is made at about 30° C. and followed by heating at 85° C. for 3 hours. The condensation mass is neutralized with sodium hydroxide and the organic layer is separated. Unreacted aniline is removed by distillation at reduced pressure. The undistilled mixture of di- and polyamines is dissolved in o-dichlorobenzene and converted to the corresponding isocyanates by phosgenation following essentially the procedure disclosed in U.S. Patent 2,822,373. After the phosgenation, the o-dichlorobenzene is removed by fractional distillation at reduced pressure. The undistilled product contains about 72% 4,4′-diisocyanatodiphenylmethane. The rest of the mixture consists of polyisocyanates and phosgenation by-products. The product contains about 31% by weight of isocyanato groups when assayed by the procedure of ASTM D 1638–60T.

POLYISOCYANATE D

A sample of Polyisocyanate C is placed in a vacuum still and 4,4′-diisocyanatodiphenylmethane is distilled at reduced pressure. The distillation is continued until the residue in the still amounts to about half the quantity of Polyisocyanate C originally charged. The product represented by the undistilled material contains about 40% 4,4′-diisocyanatodiphenylmethane. The rest of the material consists of polyisocyanates and phosgenation by-products.

POLYISOCYANATE E

A polyaryl polyisocyanate mixture is prepared by the procedures disclosed in U.S. Patent 2,683,730. The product contains about 50% by weight 4,4′-diisocyanatodiphenylmethane. The remainder of the product consists of polyisocyanates and phosgenation by-products in such amounts that the average functionality of the entire mixture is about 3 isocyanato groups per molecule.

Example 1

This example illustrates the use of a variety of surface active agents for the preparation of the emulsions of this invention.

The isocyanate/solvent mixture which is emulsified is prepared by mixing 70 parts of Polyisocyanate B with 30 parts of an isomer mixture of about equal parts of N-ethyl-o-toluenesulfonamide and the corresponding para-isomer.

The isocyanate/solvent mixture is emulsified by dissolving 1.2 parts, dry weight, of the surface active agent used in 60 parts of water contained in an Eppenbach mixer and slowly adding 40 parts of the isocyanate/solvent mixture while the mixer is running. Following this procedure, good emulsions are obtained with the following surface active agents:

(I) Polyvinyl alcohol—Non-Ionic
(II) Methyl cellulose—Non-Ionic
(III) Formaldehyde condensate of naphthalene sulfonic acid, sodium salt—Anionic
(IV) Sodium sulfonate of condensation product of an alkyl phenol with ethylene oxide—Anionic
(V) Sodium lignosulfonate—Anionic
(VI) Polyamino fatty acid amide+methyl cellulose cationic+Non-Ionic The emulsions formed with agents III, IV and V tend to phase on standing for several hours. This phasing can be prevented by the addition of about 1 part of methyl cellulose per 100 parts of emulsion.

Example 2

About 40 parts of a solution of 70 parts of Polyisocyanate B and 30 parts, N,N-dimethylcocoamide is converted to an aqueous emulsion by addition to 60 parts of water and 3 parts of surfactant III of Example 1 contained in a bottle. Agitation is furnished by a "malt" mixer. The emulsion is diluted from its original concentration of about 40% active ingredient to 20% and 5% by the addition of water. Samples of unsized kraft liner board, weighing about 42 lb./1000 sq.. ft. are wetted in water for 5 minutes and then immersed in the diluted emulsions for 15–30 seconds. The paper is removed and allowed to drain. The samples are allowed to dry in air and aged for 5 weeks at 25° C. and 50% relative humidity. The quantity of material incorporated in the paper is determined by the increase in weight of the treated samples over the weight of untreated paper. Mullen burst strength is determined on treated samples and untreated controls with the following results:

| Sample | Percent Increase Weight | Mullen Burst Strength, p.s.i. |
|---|---|---|
| Control | 0 | 95 |
| Treated, 5% Emulsion | 2.4 | 168 |
| Treated, 20% Emulsion | 5.5 | 180 |

When the procedure described in this example is repeated using an equal weight of Polyisocyanate C in place of Polyisocyanate B, treated paper showing a weight increase of 2.4% has a Mullen burst of 168 versus 95 for the control.

Example 3

A series of 3 emulsions 3-A, 3-B and 3-C is prepared from 50 parts of each of the polyisocyanate-solvent mixtures tabulated below and 50 part portions of water each containing 1 part of methyl cellulose, 1.2 parts of surfactant III of Example 1 and 0.7 part of triethylene diamine. The emulsions are made by adding the organic phase to the water phase in an Eppenbach mixer.

|  | 3-A | 3-B | 3-C |
|---|---|---|---|
| N-ethyl-o,p-toluenesulfonamide [a] | 15 | 7.5 | |
| N-Ethyl-p-toluenesulfonamide [b] | | 7.5 | 15 |
| Polyisocyanate A | 35 | 35 | 35 |

[a] Liquid mixture of about equal parts of ortho and para isomers plus a minor amount of unalkylated amide. Available commercially under the trade name "Santicizer" 8.
[b] Available commercially under the trade name "Santiclazer" 3.

Samples of kraft liner board (42 lb./1000 sq. ft.) are treated with the above emulsions. Prior to use the emulsions are diluted with 3 parts of water per part of emulsion. The paper samples are immersed in the diluted emulsions for 5 seconds, passed through rubber squeeze rolls and dried in air for 16 hours at 105° C. The samples are then aged to constant weight at 25° C. and 50% relative humidity. The increase in weight of all of the samples is about 5%. The column crush resistance of the samples is as follows: 3-A, 21.5 p.s.i.; 3-B, 24.5 p.s.i. and 3-C, 23.5 p.s.i. The untreated paper has a crush resistance of 16.3 p.s.i.

Emulsions 3-A and 3-B and 3-C are also used to prepare coatings. For this purpose the emulsions are used without dilution. Films having a wet thickness of 3 mils are drawn on plate glass and cured (1) by standing at room temperature for 24 hours and (2) by heating for 16 hours at 105° C. in an air oven. The films yield the following data shown in Table I when tested for hardness.

Example 4

A series of four mixtures containing from 1:9 to 7:3 parts by weight of N-ethyl-o,p-toluenesulfonamide described in Example 3 and Polyisocyanate B are prepared. About 100 parts of each of the four mixtures is emulsified in 94 parts of water containing 3 parts of surfactant III of Example 1, 2.5 parts of methyl cellulose and 0.5 part of triethylene diamine. The emulsification is accomplished by agitating all of the ingredients in an Eppenbach mixer for 1 minute. Samples of kraft liner board (42 lb./1000 sq. ft.) are immersed for 30 sec. in 50% emulsions, passed through rubber squeeze rolls and dried by passage through a Dowingtown drum dryer operating at a drum temperature of 140° C. and at a drum speed providing about a 9 min. cycle. After drying the paper samples are stored for 1 and 7 day periods at 23° C. and 50% relative humidity prior to testing. The amount of resin picked-up by the samples is determined by measuring the increase in the weight of the paper. Another set of paper samples is treated by the procedure described above after the original series of 50% emulsions have been diluted to 25% by the addition of an equal weight of water.

All of the papers are then tested for crush resistance using a Hinde-Dauche short column crush tester and for Mullen burst strength. Results are presented in the following table, Table II, which also includes data obtained with untreated paper for comparison.

TABLE II

| Polyisocyanate B, parts | 90 | 70 | 50 | 30 | None |
|---|---|---|---|---|---|
| Sulfonamide, parts | 10 | 30 | 50 | 70 | None |
| 50% Emulsion: | | | | | |
| Percent Weight Increase | 9-10 | 14-15 | 16 | 17 | 0 |
| Crush, 1 day aging | 31-38 | 41-44 | 38-43 | 26-33 | 19-20 |
| Crush, 7 days aging | 35-40 | 36-46 | 36-41 | 24-37 | 19-22 |
| Burst, 1 day aging | 114-128 | 98-125 | 110-114 | 114-123 | 87-113 |
| Burst, 7 days aging | 102-142 | 136-170 | 154-178 | 132-158 | 115-146 |
| 25% Emulsion: | | | | | |
| Percent Weight Increase | 3 | 10-13 | 13 | 10-12 | 0 |
| Crush, 1 day aging | 22-27 | 33-42 | 36-42 | 30-34 | 19-20 |
| Crush, 7 days aging | 24-26 | 30-33 | 33-37 | 31-35 | 19-22 |
| Burst, 1 day aging | 110-132 | 100-140 | 128-144 | 104-119 | 87-113 |
| Burst, 7 days aging | 107-161 | 137-166 | 130-160 | 135-168 | 115-146 |

Example 5

Example 4 is repeated using an equal weight of a commercial grade of N,N-dimethyl oleamide in place of N-ethyl-o,p,-toluenesulfonamide. The approximate composition of the oleamide is as follows:

|  | Percent |
|---|---|
| N,N-dimethyl myristamide | 5 |
| N,N-dimethyl palmitamide | 5 |
| N,N-dimethyl stearamide | 5 |
| N,N-dimethyl oleamide | 80 |
| N,N-dimethyl linoleamide | 5 |

This material is available commercially under the trade name "Hallcomid" M18-OL. Results are presented in the following table, Table III, which again includes control values for untreated paper.

TABLE III

| Polyisocyanate B, parts | 90 | 70 | 50 | 30 | None |
|---|---|---|---|---|---|
| N,N-dimethyl oleamide, parts | 10 | 30 | 50 | 70 | None |
| 50% Emulsion: | | | | | |
| Percent Weight Increase | 9-11 | 12-13 | 15 | 23-24 | 0 |
| Crush, 1 day | 31-34 | 37-40 | 33-40 | 21-29 | 19-20 |
| Crush, 7 days | 30-36 | 33-45 | 34-38 | 27-30 | 19-22 |
| Burst, 1 day | 109-132 | 104-133 | 154-176 | 129-140 | 87-113 |
| Burst, 7 days | 130-151 | 149-193 | 150-192 | 121-178 | 115-146 |
| 25% Emulsion: | | | | | |
| Percent Weight Increase | 4 | 6 | 12-14 | 17 | 0 |
| Crush, 1 day | 22-27 | 29-31 | 30-33 | 23-32 | 19-20 |
| Crush, 7 days | 19-26 | 28-30 | 28-37 | 24-34 | 19-22 |
| Burst, 1 day | 96-130 | 116-133 | 138-150 | 122-135 | 87-113 |
| Burst, 7 days | 103-134 | 130-165 | 181-187 | 169-174 | 115-146 |

TABLE I

|  | 3-A | 3-B | 3-C |
|---|---|---|---|
| Sward Hardness: | | | |
| Cured 24 hr., 25° C | 18 | 14 | 10 |
| Cured 16 hr., 105° C | 22 | 12 | 8 |
| Pencil Hardness: | | | |
| Cured 24 hr., 25° C | 2B | B | 3B |
| Cured 16 hr., 105° C | B | B | B |

Example 6

This example illustrates the differences in properties obtained when the compositions of this invention are applied to paper by different application techniques, specifically, saturation and sizing.

A mixture of 30 parts of the N-ethyl-o,p-toluenesulfonamide described in Example 3 and 70 parts of Polyisocyanate B is emulsified in 100 parts of water containing 2.4 parts of surfactant III of Example 1, 2.0 parts of methyl cellulose and 2.0 parts triethylene diamine by mixing in an Eppenbach mixer for about 1 minute.

Paper samples (kraft liner board weighing 42 lbs./1000 sq. ft.) are treated by saturation using the following technique. The 50% emulsion is diluted by adding 5 parts of distilled water to 1 part of concentrated emulsion. The paper samples are immersed in the dilute emulsion for 30 sec. and passed between rubber rolls to remove excess emulsion (Shore A Hardness, 75). The samples are dried by passing them through a Dowington drum dryer operating at a drum temperature of 140° C. and at a dryer speed providing about a 9 min. cycle.

The same kraft liner board is treated by sizing in the following way. The 50% emulsion is diluted by adding 1 part of distilled water to 4 parts of concentrated emulsion. The diluted emulsion is poured into a trough. Paper is drawn continuously through the emulsion contained in the trough and passed between rubber rolls at a rate of 1 ft./sec. Immersion of the paper in the emulsion is effected by passing the paper under a glass rod submerged in the emulsion. The rod is parallel to the edges of the trough and the nip of the rubber rolls. The distance from the rod to the rolls is about 1 ft., so that immersion and wringing are completed in about 1 sec. Paper treated in this apparatus is dried using the drum drier and the conditions described for drying the paper treated by saturation.

The amount of resin incorporated in the paper by the treatments is determined by measuring the percentage increase in the weight of the paper. For saturation, the increase is 4.6%; for sizing, 5%. Physical properties of the treated paper samples are determined after aging for periods of 1 and 14 days at 25° C. and 50% relative humidity. The results are tabulated below in Table IV. Information on untreated paper is included for comparison.

TABLE IV

| | Physical Prop. | | | | | |
|---|---|---|---|---|---|---|
| | Dry Burst | | Wet Burst | | Dry Crush | |
| Aging Period, days | 1 | 14 | 1 | 14 | 1 | 14 |
| Saturation | 112 | 111 | 23 | 27 | 26 | 26 |
| Sizing | 138 | 130 | 52 | 54 | 36 | 38 |
| Control | 97 | 100 | 23 | 23 | 23 | 23 |

The data show that much greater improvements in physical properties are obtained by sizing. Wetting behavior of the sized paper indicates that it is hydrophobic, while the saturated paper is more hydrophilic than the control paper.

Example 7

A mixture of 35 parts of Polyisocyanate E and 15 parts of N-ethyl-o,p-toluenesulfonamide (see Example 3) is emulsified by addition to 50 parts of water containing 1.2 parts of surfactant III of Example 1, 1 part methyl cellulose and 0.5 part of triethylene diamine. The emulsion is formed in an Eppenbach mixer. The emulsion is diluted with 3 parts of water per part of emulsion. Samples of kraft liner board (42 lb./1000 sq. ft.) are dipped in the diluted emulsion for 5 seconds, rolled with a hand roller and dried for 16 hr. at 105° C. The paper is allowed to come to constant weight at 25° C. and 50% relative humidity. The weight of the treated paper is found to have increased 6.0%. The paper samples have the following properties shown in Table V.

TABLE V

| | Control | | Treated | |
|---|---|---|---|---|
| | Wet | Dry | Wet | Dry |
| Crush Resistance, p.s.i. | 1.6 | 14.6 | 4.5 | 21.8 |
| Bursting Strength | 28 | 100 | 66 | 146 |

Dry values are obtained on paper equilibrated at 25° C. and 50% relative humidity. Wet values are obtained by soaking the paper in water at 25° C. for 10 minutes and testing immediately upon removal.

Example 8

An emulsion is prepared from a solution of 28 parts of mixed isomers of distilled tolylene diisocyanate (80% 2,4-isomer; 20% 2,6-isomer) and 12 parts of the N-ethyl-o,p-toluenesulfonamide described in Example 3 and 58 parts of water containing 1.2 parts of surfactant III of Example 1, 1.0 part methyl cellulose and 0.14 part of triethylene diamine. Emulsification is effected by adding the organic solution to the water phase in an Eppenbach mixer. Kraft liner board (42 lb./1000 sq. ft.) is treated with the full strength emulsion and with diluted emulsion prepared by mixing equal volumes of water and the full strength emulsion. Treatment involves immersing the paper in the emulsions for 2 seconds, wringing the excess emulsion from the paper with rubber rolls and drying for 8–9 min. at 140° C. on a drum dryer.

The increase in weight of the paper samples indicates the amount of material incorporated in the paper. With the concentrated emulsion, the weight increases range from 9.1–11.1%; with the dilute emulsion from 6.7–8.4%. Properties are determined after aging for periods of 1 and 7 days at 23° C. and 50% relative humidity. The results are tabulated below in Table VI.

TABLE VI

| | Untreated Control | Treated With Conc. Emulsion | | Treated With Dilute Emulsion | |
|---|---|---|---|---|---|
| Aging Time, Days | | 1 | 7 | 1 | 7 |
| Crush Resistance, p.s.i.: | | | | | |
| Dry | 23–24 | 41–43 | 42–51 | 37–39 | 42–43 |
| Wet, 10 min. in water | 2 | 12 | 11–12 | 7–8 | 9 |
| Burst Strength: | | | | | |
| Dry | 100–116 | 107–132 | 112–132 | 84–128 | 118–142 |
| Wet, 10 min. in water | 25–30 | 55–80 | 78–86 | 48–64 | 70–83 |

Example 9

The procedure of Example 5 is repeated with the exception that the 28 parts of tolylene disocyanate is replaced by 28 parts of a prepolymer prepared by reacting 1.0 mole of polytetramethylene ether glycol with 2.0 moles of tolylene-2,4-diisocyanate at 80° C. for 4 hours. This prepolymer has an isocyanato group assay of 6.3%. Properties of the paper treated with emulsions containing this prepolymer have the properties shown in Table VII.

TABLE VII

|  | Untreated Control | Treated With Conc. Emulsion | | Treated With Dilute Emulsion | |
| --- | --- | --- | --- | --- | --- |
| Aging Time, Days | | 1 | 7 | 1 | 7 |
| Crush Resistance, p.s.i.: | | | | | |
| Dry | 23-24 | 29-31 | 32-35 | 34-35 | 36-52 |
| Wet, 10 min. in water | 2 | 3 | 3 | 3 | 4 |
| Burst Strength: | | | | | |
| Dry | 100-116 | 104-150 | 140-162 | 100-117 | 111-136 |
| Wet, 10 min. in water | 25-30 | 22-26 | 38-44 | 26-28 | 33-36 |

Example 10

An emulsion is prepared from a solution of 35 parts of the reaction product of 340 parts of Polyisocyanate A and 76 parts of dipropylene glycol and 15 parts of N-ethyl-o,p-toluenesulfonamide. The reaction product which contains 23% isocyanato groups, is prepared by heating a mixture of the polyisocyanate and glycol at 80° C. for 2 hr. Emulsification is effected in an Eppenbach mixer by adding the above solution to 50 parts of water containing 2 parts of the surfactant III (Example 1) and 1 part methyl cellulose. Before use, the emulsion is diluted with distilled water to 35%.

Samples of kraft liner board (42 lb./1000 sq. ft.) are treated by immersing them for 5 seconds in the diluted emulsion, passed through rubber squeeze rolls to remove excess emulsion and drying for 16 hr. at 105° C. The paper samples are aged at 25° C. and 50% relative humidity until they reach an essentially constant weight. The treated paper shows an increase in weight of about 3.6-4%. It exhibits the properties shown in Table VIII.

TABLE VIII

|  | Untreated Control | Treated Paper |
| --- | --- | --- |
| Burst Strength: | | |
| Dry | 95 | 135 |
| Wet, 10 min. in water | 20 | 30 |
| Crush Reistance, p.s.i.: | | |
| Dry | 20 | 32 |
| Wet, 10 min. in water | 2 | 3 |

Example 11

This example illustrates the treatment of paper with a mixture prepared by adding a synthetic elastomer emulsion to an emulsion of the present invention. For purposes of comparison, paper samples treated with the separate emulsions are also prepared. The separate emulsions employed are a Neoprene Latex, Type 450, diluted to 20% solids and a 20% emulsion of 170 parts of Polyisocyanate B and 30 parts N-ethyl-o,p-toluenesulfonamide obtained by diluting 50% emulsion prepared as in Example 3A. The mixture of emulsions is preparing from equal weights of the separate emulsions.

Paper is treated with the two separate emulsions and the mixed emulsion by prewetting samples of liner board (42 lb./1000 sq. ft.) for 5 minutes and immersing them in the various emulsions for 1 minute. The samples are passed between steel rolls to remove excess emulsion and then allowed to air dry to a constant weight at 23° C. 50% relative humidity. The increase in weight measure the quantity of elastomer and/or resin picked up. Dry crush resistance and dry burst strength are determined on the samples with the results shown in Table IX. Values for untreated paper sample are included for comparison.

TABLE IX

|  | Control | A | B | C |
| --- | --- | --- | --- | --- |
|  |  | 20% Neoprene Latex Type 450 | 20% Emulsion This Invention | Mixture of A and B |
| Percent Weight Increase | 0 | 11 | 8 | 9 |
| Dry Crush | 20 | 20 | 25 | 26 |
| Dry Burst | 100-110 | 150 | 120-130 | 140-150 |

The neoprene latex improves burst strength but has little effect on crush resistance. The emulsion of this invention improves crush and to a limited extent burst strength. The combination improves both properties significantly.

When commercially available papers containing neoprene added as a latex either at the beater or by saturation of a paper web are treated with the emulsions of this invention and dried, the resulting compositions are reinforced and show excellent resistance to wet abrasion.

Example 12

As previously indicated hereinbefore the emulsions of the present invention may be used for a variety of applications. Four polyisocyanate-solvent mixtures are converted to 50% emulsions by the procedure of Example 3A. The mixtures have the following compositions by weight:

(A) 70 Polyisocyanate B/30 N,N-dimethyloleamide
(B) 70 Polyisocyanate E/30 N,N-dimethyloleamide
(C) 70 Polyisocyanate B/30 N-ethyl-o,p-toluenesulfonamide
(D) 70 Polyisocyanate E/30 N-ethyl-o,p-toluenesulfonamide.

A number of substances are treated by dipping in these emulsions and drying on a drum dryer at 140° C. for 9 minutes. This treatment converts blotting paper to a stiff, scuff-resistant material having characteristics which make it suitable as a leather substitute. Acid washed filter paper is reinforced by the treatment. Cotton muslin and cotton duck are stiffened and strengthened. Leather after treatment, is scuff-resistant and is stiffened. The fibers of glass mat and glass cloth are tightly bound by this treatment. Nylon fabric is sealed by treatment and should be useful for tents, tarpaulins, fuel cells and the like.

In addition to these materials, plywood is coated with the emulsions. After drying at room temperature the result is a semi-gloss coating. Steel and aluminum are also coated by application of the 50% emulsion followed by room temperature drying.

When clay filled paper is coated with emulsion, allowed to reach a tacky stage, and dusted with abrasive grit, an abrasive paper is obtained.

As many widely differing embodiments of this invention may be made without departing from the scope thereof it is to be understood that this invention is not limited to the specific embodiments thereof, except as defined in the appended claims.

I claim:

1. An aqueous emulsion comprising:
   (I) from 10 to 100 parts by weight of water and
   (II) a stabilizing amount of an emulsifying agent, having dispersed therein
   (III) 10 parts by weight of an aromatic isocyanate compound containing at least 4% by weight of aromatic isocyanato groups and having an isocyanato functionality of at least 2, dissolved in
   (IV) from 1 to 100 parts by weight of a solvent comprising N-alkylated aliphatic carboxylic acid amide, said amide having from 6 to 25 carbon atoms of an N-alkylated sulfonamide, said sulfonamide having from 6 to 25 carbon atoms or mixtures thereof.

2. Composition of claim 1 in which the said aromatic isocyanate comprises a mixture of toluene diisocyanate isomers.

3. Composition of claim 2 in which the said aromatic isocyanate comprises the undistilled phosgenation product of mixed tolylene diamine isomers.

4. Composition of claim 1 in which the said aromatic amine is the phosgenation product of a crude mixture of polyamines produced by the reaction of aniline and formaldehyde.

5. Composition of claim 1 in which the said solvent comprises a mixture of ortho and para isomers of N-ethyl toluenesulfonamide.

6. Composition of claim 1 in which the said solvent is dimethyl cocoamide.

References Cited
UNITED STATES PATENTS

| | | | |
|---|---|---|---|
| 2,946,746 | 7/1960 | Keller | 252—312 |
| 2,968,575 | 1/1961 | Mallonee | 260—29.2 |
| 3,148,173 | 9/1964 | Axelrood | 260—75 |
| 3,248,259 | 4/1966 | Borsellino et al. | 260—29.2 |
| 3,317,481 | 5/1967 | Youker | 260—77.5 |

MURRAY TILLMAN, *Primary Examiner.*

J. T. GOOLKASIAN, *Assistant Examiner.*

U.S. Cl. X.R.

117—154, 155; 252—312; 260—29.7, 77.5, 453